United States Patent
Söderberg

(10) Patent No.: US 7,533,637 B2
(45) Date of Patent: May 19, 2009

(54) METHOD AND ARRANGEMENT FOR COOLING A VEHICLE ENGINE WHILE HEATING THE VEHICLE CAB

(75) Inventor: Pehr Söderberg, Södertälje (SE)

(73) Assignee: Scania CV AB (publ) (SE)

( * ) Notice: Subject to any disclaimer, the term of this patent is extended or adjusted under 35 U.S.C. 154(b) by 0 days.

(21) Appl. No.: 11/573,867

(22) PCT Filed: Jun. 28, 2005

(86) PCT No.: PCT/SE2005/001014

§ 371 (c)(1),
(2), (4) Date: Feb. 16, 2007

(87) PCT Pub. No.: WO2006/019343

PCT Pub. Date: Feb. 23, 2006

(65) Prior Publication Data

US 2007/0266964 A1 Nov. 22, 2007

(30) Foreign Application Priority Data

Aug. 16, 2004 (SE) .................................. 0402014

(51) Int. Cl.
*F01P 3/20* (2006.01)
*F01P 5/14* (2006.01)
(52) U.S. Cl. ............. 123/41.51; 123/41.15; 237/12.3 A
(58) Field of Classification Search ............... 123/41.01, 123/41.15, 41.29, 41.51; 237/12.3 A, 12.3 B
See application file for complete search history.

(56) References Cited

U.S. PATENT DOCUMENTS

| 3,309,020 | A | 3/1967 | Cobley |
| 6,481,387 | B1 | 11/2002 | Sano |
| 7,004,245 | B2 * | 2/2006 | Abdeljawad ................ 165/203 |

FOREIGN PATENT DOCUMENTS

| DE | 36 02 2528 A1 | 7/1987 |
| EP | 0 293 334 A1 | 11/1988 |
| EP | 293334 A1 * | 11/1988 |
| JP | 02220916 A * | 9/1990 |

OTHER PUBLICATIONS

International Search Report PCT/SE2005/001014 dated Oct. 25, 2005 (Swedish Patent Office).

* cited by examiner

*Primary Examiner*—Noah Kamen
(74) *Attorney, Agent, or Firm*—Ostrolenk, Faber, Gerb & Soffen, LLP

(57) ABSTRACT

Method for cooling in a motor vehicle comprising: cooling at least the vehicle engine by a liquid-based cooling system in which coolant is cooled by air in a first heat exchange element which is by the vehicle radiator; heating the cab of the motor vehicle by heating air by using a coolant in a separate second cab exchange element and supplying the heated air to the cab by a fan. The second cab heat exchange element is arranged in a separate cooling configuration by which coolant in the second heat exchange element is cooled by air which is thereafter supplied to spaces other than the cab. There are also devices for accomplishing such cooling, such heating, such heat exchange and such supplying of air.

14 Claims, 1 Drawing Sheet

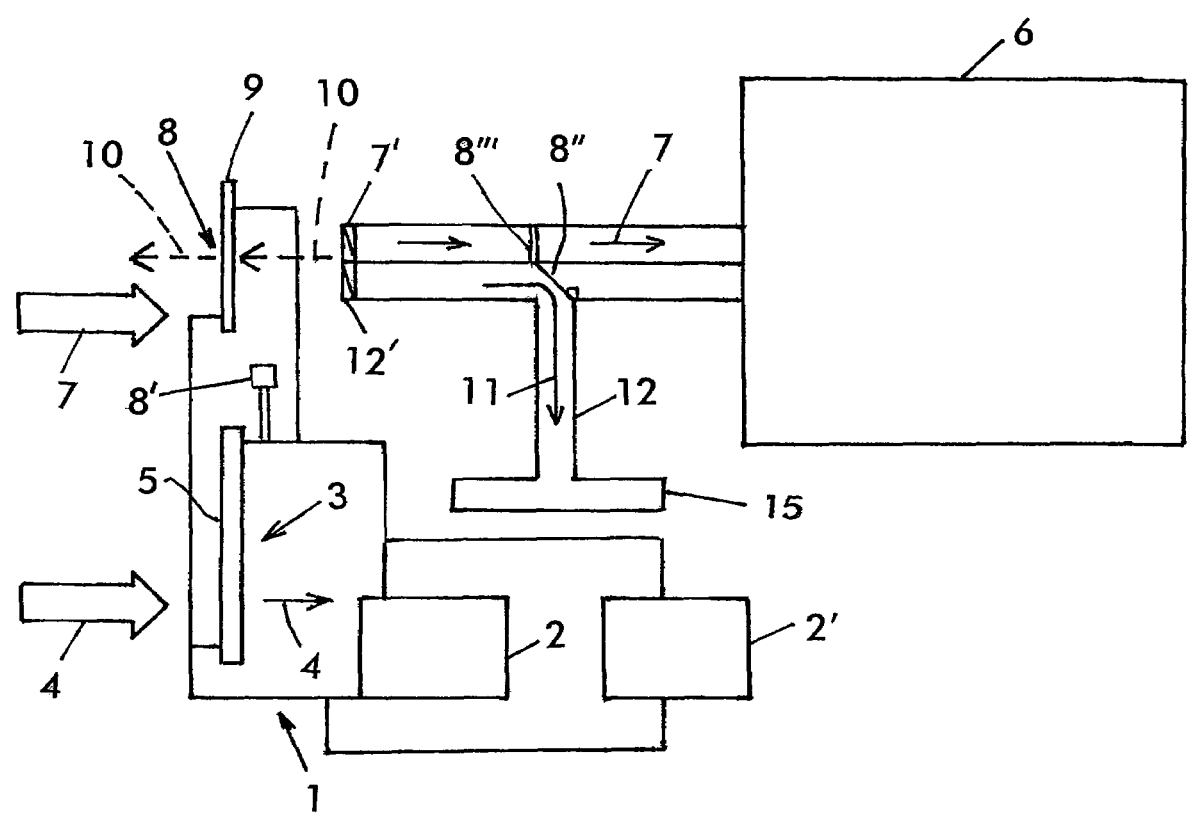
The Drawing

METHOD AND ARRANGEMENT FOR COOLING A VEHICLE ENGINE WHILE HEATING THE VEHICLE CAB

CROSS REFERENCE TO RELATED APPLICATION

The present application is a 35 U.S.C. §§371 national phase conversion of PCT/SE2005/001014, filed 28 Jun. 2005, which claims priority of Swedish Application No. 0402014-5, filed 16 Aug. 2004. The PCT International Application was published in the English language.

1. BACKGROUND

1.1 Technical Field

The present invention relates to a method for cooling a vehicle engine, while also heating the cab and other spaces in the vehicle.

The invention also relates to a device for such cooling of the engine and for conducting air from a heat exchanger to the cab.

1.2 State of the Art

An extremely important design problem concerning motor vehicles, particularly heavy motor vehicles such as trucks, is the incorporation of a cooling system with sufficient cooling capacity. Large powers have to be cooled away at times of substantial or full power output and during braking with so-called retarders. For this reason, arrangements exist for restricting engine output or retarder braking effect when the coolant reaches too high a temperature. Such restriction is of course undesirable because it limits the use of the vehicle.

The object of the present invention is to increase current capacity for cooling a vehicle's coolant in order to reduce the need for restriction of engine output and braking effect.

2. SUMMARY OF THE INVENTION

The invention concerns a method and a device for cooling an engine of the vehicle, and also a retarder for the vehicle, for heating the cab, for controlling the temperature of the coolant heating the cab and for sending heated air to other spaces in the vehicle than the cab. There is a first liquid based cooling system in which first coolant circulates and the first coolant is cooled by air cooling in a first heat exchange element in the system, and the first heat exchange element is by the radiator of the vehicle.

To heat the cab of the vehicle, air is heated by passing air over a second cab heat exchange element which is in a separate cooling configuration. Air passes the second cab heat exchange element and is heated, and that heated air is delivered to the cab. The coolant in the second coolant configuration including the second heat exchange element is cooled by air. A separate fan at the second heat exchange element supplies heated air which has been heated by the second heat exchange element to spaces other than the can. The method of operation and the structure are disclosed.

3. BRIEF DESCRIPTION OF THE DRAWINGS

The invention is described below in more detail with reference to examples of embodiments and the attached drawing, in which the FIGURE is a schematic diagram of two embodiments of a device according to the invention.

4. DETAILED DESCRIPTION OF PREFERRED EMBODIMENTS

In the FIGURE, ref. 1 denotes a liquid-based cooling system for cooling at least the engine 2 of a motor vehicle. The cooling system may also be adapted to cooling other items of the vehicle, e.g. a so-called retarder 2' for braking such as one used, inter alia, in trucks. The coolant of the cooling system is intended to be cooled in a heat exchange element 3 by air, represented by arrows 4, in the vehicle's radiator 5 which is intended to have air passing through it.

The motor vehicle's cab 6 is intended to be heated, when cab heating is needed, by air, represented by arrows 7, which air is intended to be heated by coolant in a separate cab heat exchange element 8 and to be supplied thereafter to the cab by a fan 7'.

In a preferred version, the heat exchanger 9 of the cab heat exchange element 8 and the fan are arranged in a separate cooling configuration whereby the coolant is intended to be cooled by air, represented by broken arrows 10 and an angled arrow 11, which air is intended to be supplied thereafter to other spaces 15 than the cab, the cab heat exchanger thus being used for cooling of coolant without the cab being warmed by the heated air.

According to a preferred embodiment, there are devices (not depicted), e.g. temperature detection means, a valve device and a control device for the latter, for initiating cooling of the coolant by the separate cooling configuration when the temperature of the coolant exceeds a predetermined level.

According to a likewise preferred embodiment, represented by the broken arrows 10, there are devices 7" for reversing the fan 7' of the cab heat exchange element, for use in the separate cooling configuration, without heated air being supplied to the cab. Embodiments are conceivable whereby the direction of rotation of the fan is reversed as compared with the usual direction but also whereby the fan blades are turned, with no change of direction of rotation, to drive air in the opposite direction to the usual one. Such a version draws air corresponding to the broken arrows 10 out of the cab.

According to a further preferred embodiment, represented by the angled arrow 11, there is at least one separate air supply duct 12 leading to a space other than the cab, for use in the separate cooling configuration. A fan 12' directs that air. According to what in some cases is a preferred addition to this embodiment, there is an arrangement 8" for supplying the cab with a preferably predetermined portion of the air heated by the separate cooling configuration. According to one version, said arrangement comprises damper devices 8" adapted to separating a portion, for supply to the cab, of the heated air.

The method and also the function of the device according to the invention are probably substantially indicated above. In the separate cooling configuration, the heat exchanger of the cab heat exchange element is thus used to supplement when necessary the ordinary cooling system, which cools at least the engine, by further cooling capacity irrespective of whether cab heating is desired or not.

The invention is described above with reference to examples of embodiments. More embodiments and also minor modifications and additions are of course conceivable without departing from the fundamental concept of the invention.

Thus embodiments are conceivable in which the separate cooling configuration comprises separate fan devices (not depicted), arranged for the purpose, for air cooling of coolant by the heat exchanger of the cab heat exchange element and for supplying the air thus heated to spaces other 15 than the cab. It is also conceivable for such fan devices to be used in combination with the fan of the cab heat exchange element.

The version with separate fan devices is particularly suitable for being combined with at least one separate air supply duct 12.

The invention is thus is not to be regarded as limited to the embodiments indicated above, but may be varied within its scope indicated by the attached claims.

The invention claimed is:

1. A method for cooling in a motor vehicle including a cab, a vehicle engine and a radiator, the method comprising:
    cooling at least the vehicle engine using a liquid-based cooling system containing a coolant by air cooling the coolant in a first heat exchange element by the vehicle radiator;
    cooling the coolant in a separate cooling configuration including a cab heat exchange element by flowing air over the cab heat exchange element, the cab heat exchange element operable to heat the cab by supplying the air in a heated state to the cab by a first fan; and
    operating a second fan device different from the first fan and operable to move air past the cab heat exchange element for supplying the air in the heated state to target spaces other than the cab via an air supply duct.

2. The method according to claim 1, further comprising reversing the second fan device for moving the air over the cab heat exchange element and away from the cab.

3. The method according to claim 1, wherein the cooling of the coolant in the separate cooling configuration occurs when a temperature of the coolant in the separate cooling configuration exceeds a predetermined level.

4. The method according to claim 1, further comprising supplying some of the air heated by the separate cooling configuration to the cab.

5. A device for cooling in a motor vehicle with an engine, a cab and a radiator, the device comprising:
    a first liquid-based cooling system for cooling the motor vehicle, the first liquid-based cooling system including the radiator for cooling a coolant by a first air flow passing to the radiator;
    a cab heat exchange element positioned as part of a separate cooling configuration and operable to cool the coolant by a second air flow at the cab heat exchange element, the separate cooling configuration operable to provide the second air flow in a heated state from the cab heat exchange element to the cab;
    a first fan device positioned and operable to supply air past the second cab heat exchange element, and then to the cab;
    a second fan device different from the first fan device and operable with the cab heat exchange element in the separate cooling configuration to supply the second air flow in the heated state from the cab heat exchange element to target spaces other than the cab; and
    an air supply duct positioned and configured to provide the second air flow in the heated state from the cab heat exchange element to the target spaces.

6. The device according to claim 5, wherein the second fan device comprises a device for reversing the second fan device for moving the second air flow over the cab heat exchange element and away from the cab.

7. The device according to claim 5, further comprising a device for initiating cooling of the coolant at the separate cooling configuration when a temperature of the coolant exceeds a predetermined level.

8. The device according to claim 5, further comprising a device for supplying the cab with a predetermined portion of the second air flow heated by the separate cooling configuration.

9. The device according to claim 8, further comprising a damper device for separating a portion of the second air flow heated by the separate cooling configuration, which portion is to be supplied to the cab.

10. A cab cooling configuration for cooling an engine in a motor vehicle that includes a cab and a radiator for cooling the engine by cooling an engine coolant by a first air flow passing to the radiator, the cab cooling configuration comprising:
    a cab heat exchange element positioned and operable to cool the engine coolant by a second air flow at the cab heat exchange element, the cab cooling configuration operable to provide the second air flow in a heated state from the cab heat exchange element to the cab;
    a first fan device positioned and operable to supply air past the cab heat exchange element, and then to the cab;
    a second fan device different from the first fan device and operable with the cab heat exchange element to supply the second air flow in the heated state from the cab heat exchange element to target spaces, the target spaces being spaces other than the cab; and
    an air supply duct positioned and configured to provide the second air flow in the heated state from the cab heat exchange element to the target spaces.

11. The cab cooling configuration according to claim 10, wherein the second fan device comprises a device for reversing the second fan device for moving the second air flow over the cab heat exchange element and away from the cab.

12. The cab cooling configuration according to claim 10, further comprising a device for initiating cooling of the engine coolant at the cab cooling configuration when a temperature of the engine coolant exceeds a predetermined level.

13. The cab cooling configuration according to claim 10, further comprising a device for supplying the cab with a predetermined portion of the second air flow heated by the cab cooling configuration.

14. The cab cooling configuration according to claim 13, further comprising a damper for separating a portion of the second air flow heated by the cab cooling configuration, which portion is to be supplied to the cab.

* * * * *